US009482139B2

(12) United States Patent
Ashikawa et al.

(10) Patent No.: US 9,482,139 B2
(45) Date of Patent: Nov. 1, 2016

(54) DUMP TRUCK

(71) Applicant: KOMATSU LTD., Minato-ku, Tokyo (JP)

(72) Inventors: Hirokazu Ashikawa, Oyama (JP); Takayuki Tashiro, Hitachinaka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/763,343

(22) PCT Filed: Dec. 1, 2014

(86) PCT No.: PCT/JP2014/081750
§ 371 (c)(1),
(2) Date: Jul. 24, 2015

(87) PCT Pub. No.: WO2015/125374
PCT Pub. Date: Aug. 27, 2015

(65) Prior Publication Data
US 2016/0201543 A1 Jul. 14, 2016

(51) Int. Cl.
*F01N 13/18* (2010.01)
*B60K 13/04* (2006.01)
(Continued)

(52) U.S. Cl.
CPC .............. *F01N 13/18* (2013.01); *B60K 13/04* (2013.01); *B60P 1/04* (2013.01); *B62D 21/186* (2013.01); *B62D 33/06* (2013.01); *F01N 3/021* (2013.01); *F01N 3/2066* (2013.01)

(58) Field of Classification Search
CPC ...... F01N 13/18; F01N 3/021; F01N 3/0211; F01N 3/20; F01N 3/2066; B60K 13/00; B60K 13/04; B60P 1/04; B62D 21/186; B62D 33/06

USPC .................................................. 180/291, 309
See application file for complete search history.

(56) References Cited

U.S. PATENT DOCUMENTS 8,191,668 B2 * 6/2012 Keane .................... B60K 13/04
                                                    180/296
8,820,468 B2 * 9/2014 Sekiya ................... B60K 13/04
                                                    180/309
(Continued)

FOREIGN PATENT DOCUMENTS

JP          58018871 U      2/1983
JP          01098780 U      7/1989
(Continued)

OTHER PUBLICATIONS

Japanese Office Action (and English translation thereof) dated Sep. 8, 2015, issued in counterpart Japanese Application No. 2015-526813.
(Continued)

*Primary Examiner* — John Walters
(74) *Attorney, Agent, or Firm* — Holtz, Holtz & Volek PC

(57) ABSTRACT

A dump truck includes: a main frame; an engine installed in the main frame; and an exhaust aftertreatment device that purifies exhaust gas from the engine. The main frame includes a vertical member in a portal shape which projects in a vehicle height direction of the dump truck and extends in a vehicle width direction of the dump truck. The exhaust aftertreatment device is supported by the vertical member. With this arrangement, maintenance of the engine can be conducted while the exhaust aftertreatment device is kept attached to the vertical member.

3 Claims, 6 Drawing Sheets

(51) Int. Cl.
  *B60P 1/04* (2006.01)
  *B62D 33/06* (2006.01)
  *B62D 21/18* (2006.01)
  *F01N 3/20* (2006.01)
  *F01N 3/021* (2006.01)

(56) References Cited

U.S. PATENT DOCUMENTS

| | | | |
|---|---|---|---|
| 8,997,915 B2* | 4/2015 | Hayashi | B60K 13/04 |
| | | | 180/296 |
| 9,180,774 B2* | 11/2015 | Mizuno | B60K 13/04 |
| 2010/0031644 A1 | 2/2010 | Keane et al. | |
| 2014/0182963 A1 | 7/2014 | Sekiya | |
| 2014/0196974 A1 | 7/2014 | Hayashi et al. | |

FOREIGN PATENT DOCUMENTS

| | | |
|---|---|---|
| JP | 02068249 U | 5/1990 |
| JP | 02083126 U | 6/1990 |
| JP | 5438249 B1 | 3/2014 |
| JP | 2014065441 A | 4/2014 |
| WO | 2014064956 A1 | 5/2014 |

OTHER PUBLICATIONS

International Search Report (ISR) issued in International Application No. PCT/JP2014/081750.

* cited by examiner

DUMP TRUCK

TECHNICAL FIELD

The present invention relates to a dump truck, more specifically, to an improvement in an installation arrangement of an exhaust aftertreatment device installed in the dump truck.

BACKGROUND ART

It has typically been known that a dedicated filter (DPF: Diesel Particulate Filter) is used to capture particulate matter (PM) contained in exhaust gas from an internal combustion engine such as a diesel engine. A working vehicle (e.g., a dump truck and a wheel loader) in which a diesel engine is installed is required to comply with an exhaust gas regulation. Accordingly, an exhaust aftertreatment device provided with the DPF is installed in the working vehicle. The exhaust aftertreatment device is provided in an exhaust gas path from the engine (see Patent Literature 1).

In a working vehicle to travel on a rough ground and a wet and soft ground of a mine and the like, when the exhaust aftertreatment device is disposed on a lower side of the working vehicle, the exhaust aftertreatment device may be hit by pebbles thrown up during travelling of the working vehicle, or the working vehicle may sink in a wet ground together with the exhaust aftertreatment device to damage the exhaust aftertreatment device. For this reason, it is proposed to install the exhaust aftertreatment device at a higher position in such a working vehicle. For instance, in a wheel loader of Patent Literature 1, the exhaust aftertreatment device is superposed on the engine.

CITATION LIST

Patent Literature(s)

Patent Literature 1: International Publication No. WO2014/064956

SUMMARY OF THE INVENTION

Problems to be Solved by the Invention

However, when the exhaust aftertreatment device is superposed on the engine, it is necessary to remove the exhaust aftertreatment device, which is an obstacle for maintenance, prior to maintenance of the engine. For this reason, maintainability of the engine is poor. On the other hand, when the exhaust aftertreatment device is disposed far apart from the engine in order to avoid occurrence of such a disadvantage of the engine, a pipe connecting the engine with the exhaust aftertreatment device becomes long and complicated, so that the maintainability of the engine is also poor.

In light of the above circumstances, an object of the invention is to provide a favorably maintainable dump truck.

Means for Solving the Problems

A dump truck according to an aspect of the invention includes: a main frame; an engine installed to the main frame; and an exhaust aftertreatment device that purifies exhaust gas from the engine, in which the main frame is provided with a vertical member in a portal shape which projects in a vehicle height direction of the dump truck and extends in a vehicle width direction of the dump truck, and the exhaust aftertreatment device is supported by the vertical member.

According to the above aspect of the invention, the engine is installed to the main frame and the exhaust aftertreatment device is supported by the vertical member of the main frame. In other words, the engine and the exhaust aftertreatment device are each independently supported by the main frame. Accordingly, maintenance of the engine can be performed while the exhaust aftertreatment device is kept attached to the main frame.

Moreover, since the vertical member is usually disposed near a back end of the engine, when the exhaust aftertreatment device is provided on the vertical member, the exhaust aftertreatment device is positioned on a back side of the engine, so that a space for the maintenance of the engine can be secured above the engine.

Further, since the exhaust aftertreatment device is disposed near the engine when the exhaust aftertreatment device is disposed on the vertical member, a pipe connecting the exhaust aftertreatment device with the engine can be shortened. With this arrangement, layout of the pipe can be simplified.

As described above, according to the above aspect of the invention, maintenance of the dump truck can be facilitated.

With this arrangement, a cab for an operator to sit in is preferably positioned at a first side of the vertical member in the vehicle width direction, and the exhaust aftertreatment device is preferably supported by a second side of the vertical member in the vehicle width direction.

With this arrangement, preferably, the vertical member includes: a pair of vertical frames that extends in the vehicle height direction; and a cross frame that extends in the vehicle width direction and bridges upper ends of the respective vertical frames, at least one side of the cross frame in the vehicle width direction, which corresponds to the second side of the vertical member, is tilted downward, and the exhaust aftertreatment device is provided on the tilted cross frame.

With this arrangement, the exhaust aftertreatment device is preferably provided to the vertical member such that a center of the exhaust aftertreatment device in a front-back direction is shifted backward relative to the vertical member.

DESCRIPTION OF EMBODIMENT(S)

Figure 1:
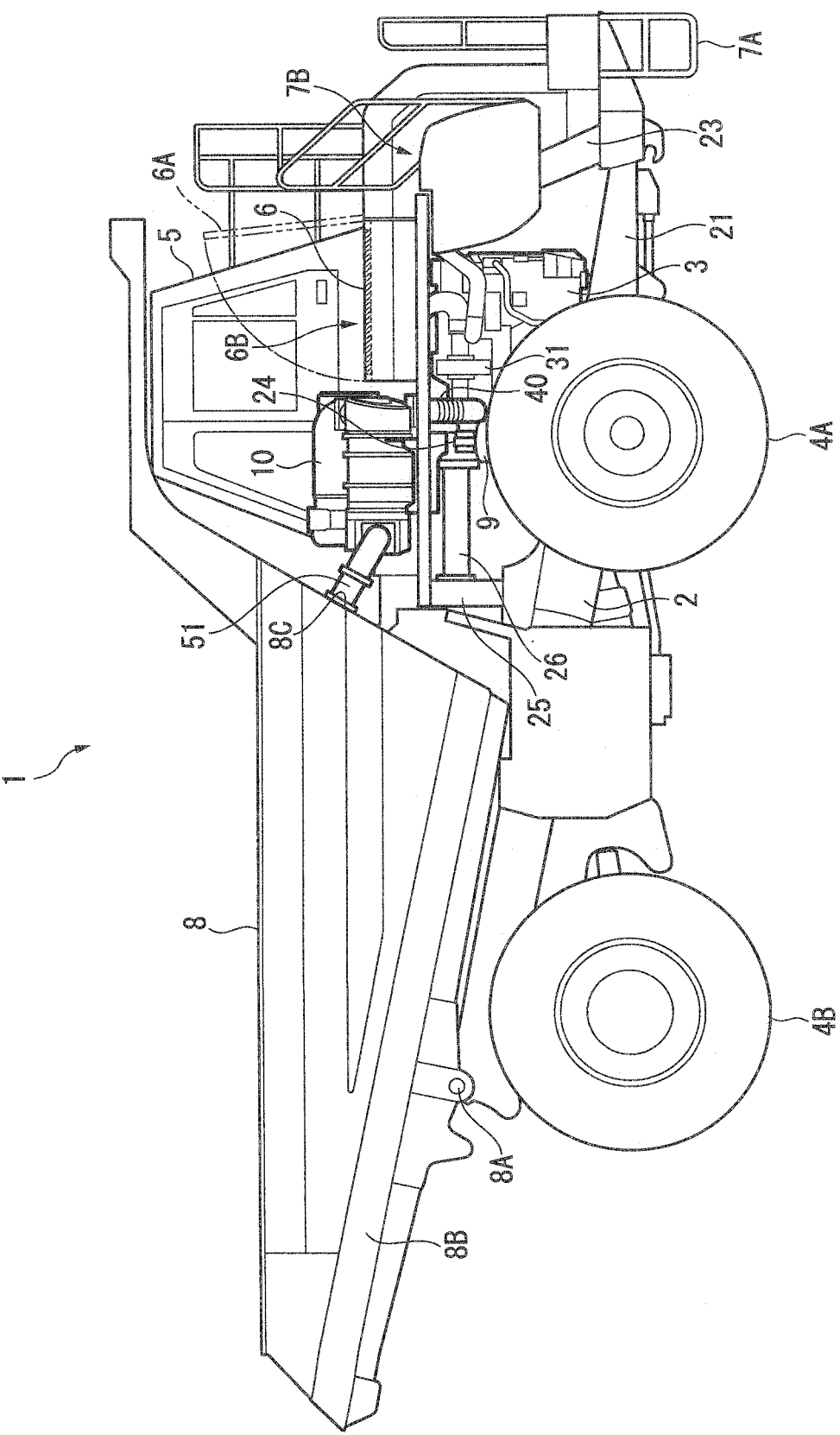
FIG. 1 is a right-side view of an entirety of a dump truck according to an exemplary embodiment of the invention.

An exemplary embodiment of the invention will be described below with reference to the drawings.

In the following description, a front-back direction (or front and back), a right-left direction (or right and left) and an up-down direction (or top and bottom) respectively mean those of an operator facing the front and sitting on a cab seat in a cab 5 of a dump truck 1. The right-left direction conforms with a vehicle width direction of the dump truck 1 and the up-down direction conforms with a vehicle height direction of the dump truck 1.

In FIGS. 3 to 6, a main frame 2, an engine 3, an exhaust aftertreatment device 10, and a communication pipe 40, which are relevant parts of the invention, are exclusively shown and other portions are omitted.

Description of Outline of Dump Truck

Figure 2:
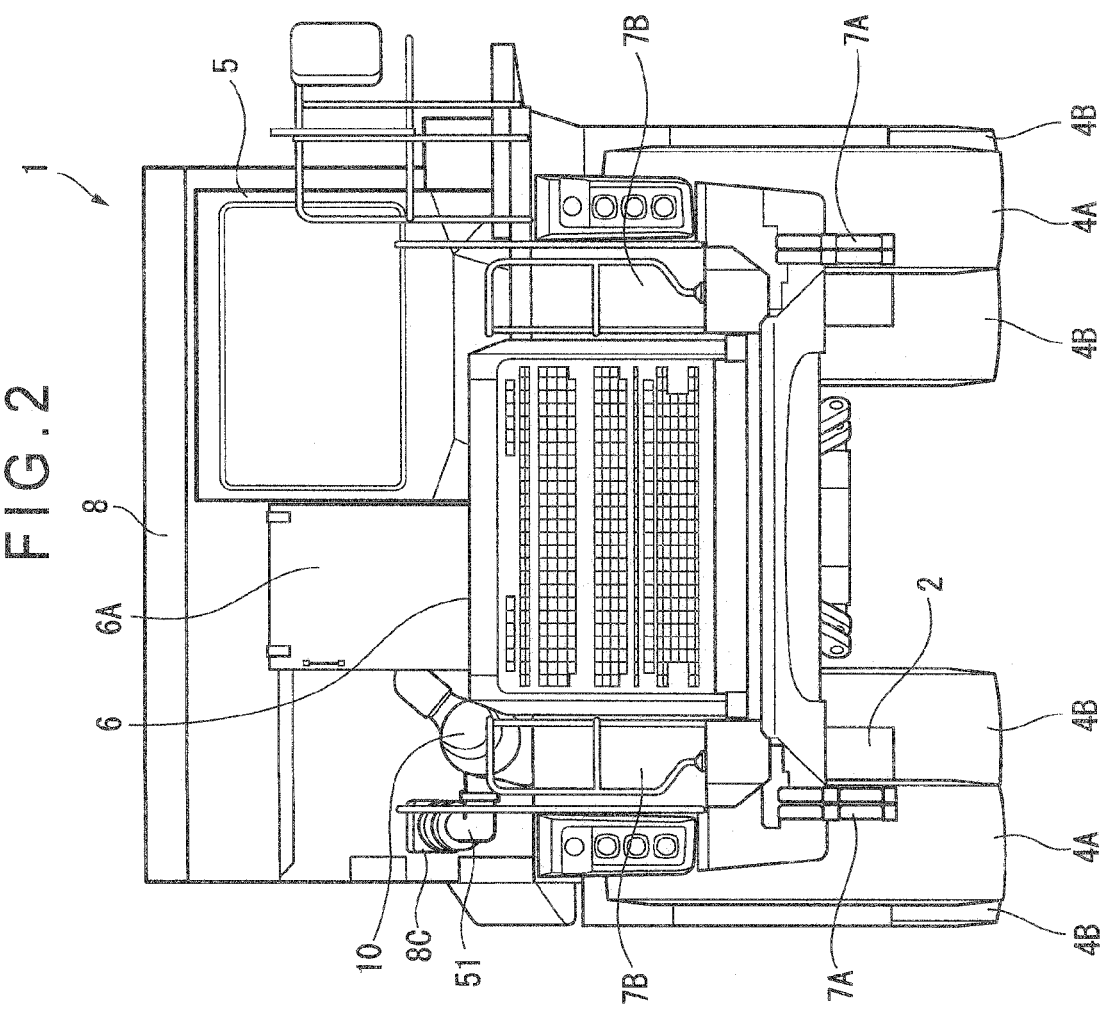
FIG. 2 is a front view of the dump truck.
Figure 3:
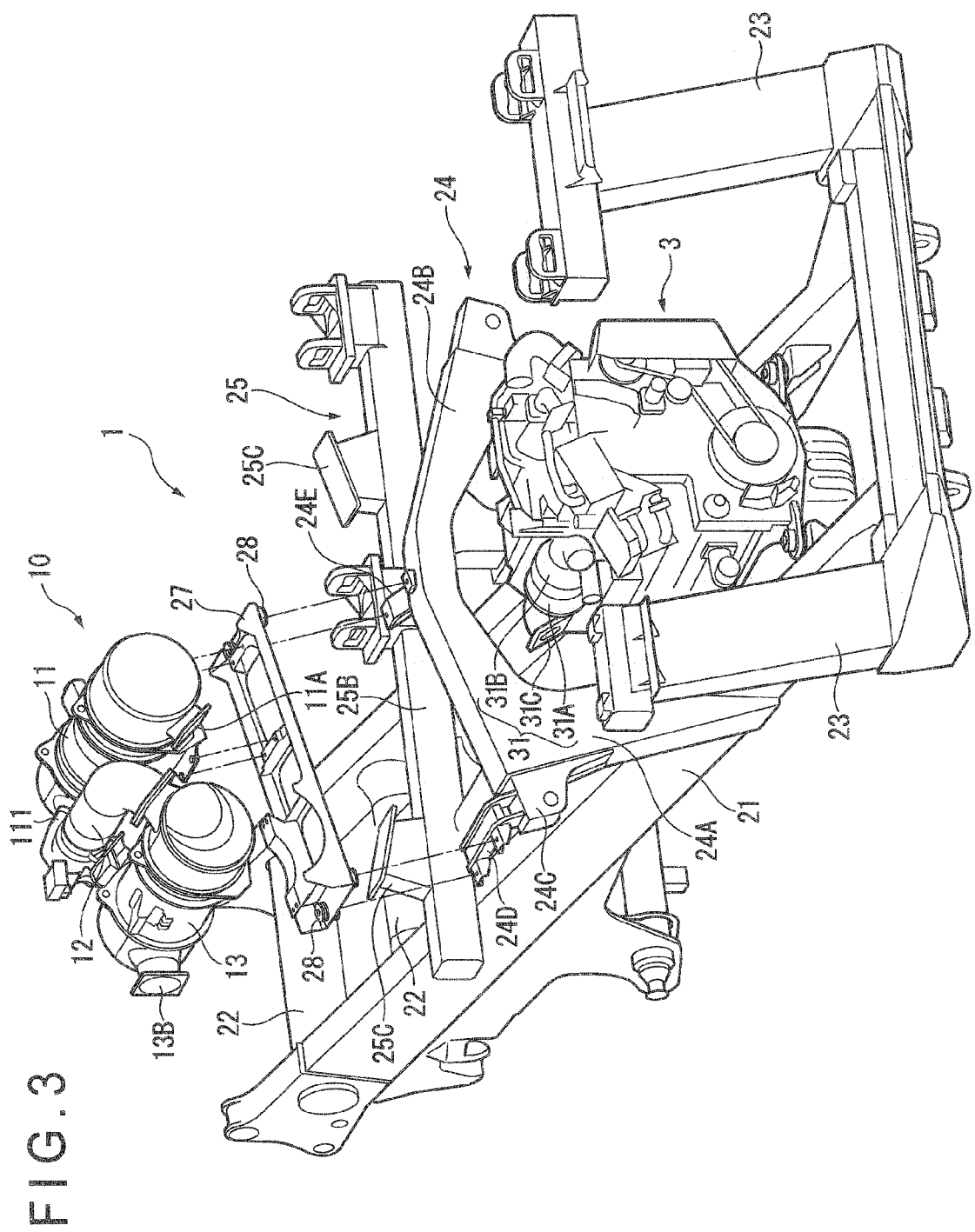
FIG. 3 is an exploded perspective view showing a relevant part of the dump truck.

As shown in FIGS. 1 to 3, the dump truck 1 includes the main frame 2 extending in the front-back direction of a vehicle body. The engine 3 is installed in the front of the main frame 2. The engine 3 of this exemplary embodiment is a diesel engine. The engine 3 includes an intake pipe into which fresh air flows, an exhaust pipe from which exhaust gas is discharged, and a supercharger 31.

The supercharger 31 is disposed between exhaust pipes. As shown in FIG. 3, the supercharger 31 includes: an exhaust turbine 31A that is rotated by the exhaust gas; and a compressor 31B that is disposed between the intake pipes and rotated together with the exhaust turbine 31A. The exhaust turbine 31A and the compressor 31B are disposed in a top-right portion of the engine 3 while being aligned in the front-back direction. An exhaust turbine outlet 31C of the exhaust turbine 31A positioned behind the compressor 31B is directed rightward and is connected to an upstream pipe inlet 41A that is an inlet of a later-described communication pipe 40. A downstream pipe outlet 43B (see FIG. 5), which is an outlet of the communication pipe 40, is connected to a DPF device inlet 11A that is an inlet of the exhaust aftertreatment device 10.

The cab 5 is provided to a front-right portion of the main frame 2. A platform 6 that is a flat operation area is provided on the right of the cab 5. As shown in FIGS. 1 and 2, the platform 6 is provided with an inspection opening 6B having an openable/closeable door 6A. The inspection opening 6B communicates with an engine room.

Moreover, a ladder 7A and a step 7B for the operator to go up and down between the cab 5/platform 6 and the ground are provided at a front end of the main frame 2.

As shown in FIGS. 1 and 2, travel wheels (front wheels 4A and rear wheels 4B) are attached to the front-right, front-left, back-right and back-left of the main frame 2. A vessel 8 in which a truckload (e.g., excavated stones and sands) is loaded is provided to a back portion of the main frame 2. By extension and retraction of a hoist cylinder (not shown), the vessel 8 can be raised or lowered around a rotary shaft 8A provided to a back end of the main frame 2.

In order to prevent the truckload from adhering to a load surface of the vessel 8 when the truckload is discharged, the dump truck 1 includes an exhaust gas flow path formed using an inner space of a rib 8B provided on an external surface of the vessel 8. The exhaust gas from the engine 3 is flowed into the exhaust gas flow path, thereby heating the vessel 8. A vessel inlet 8C into which the exhaust gas flows is provided on the right side of a front surface of the vessel 8. When the vessel 8 is not raised, the vessel inlet 8C communicates via a connecting pipe 51 with an SCR device outlet 13B that is an outlet of the exhaust aftertreatment device 10, whereby the exhaust gas flows into the rib 8B. Since moisture contained in the truckload is evaporated by heating the vessel 8 to make the truckload dry, the truckload can be prevented from adhering to the load surface.

Description of Main Frame

As shown in FIGS. 3 to 6, the main frame 2 includes: a pair of side members 21 extending in parallel to each other in the front-back direction; and a plurality of cross members 22 extending in the right-left direction to connect the pair of side members 21. Sequentially from the front, front supports 23 extending upward in a slanted manner in a lateral view, a vertical member 24 extending substantially vertically upward, and a vessel support 25 are vertically provided on the side members 21.

Figure 4:
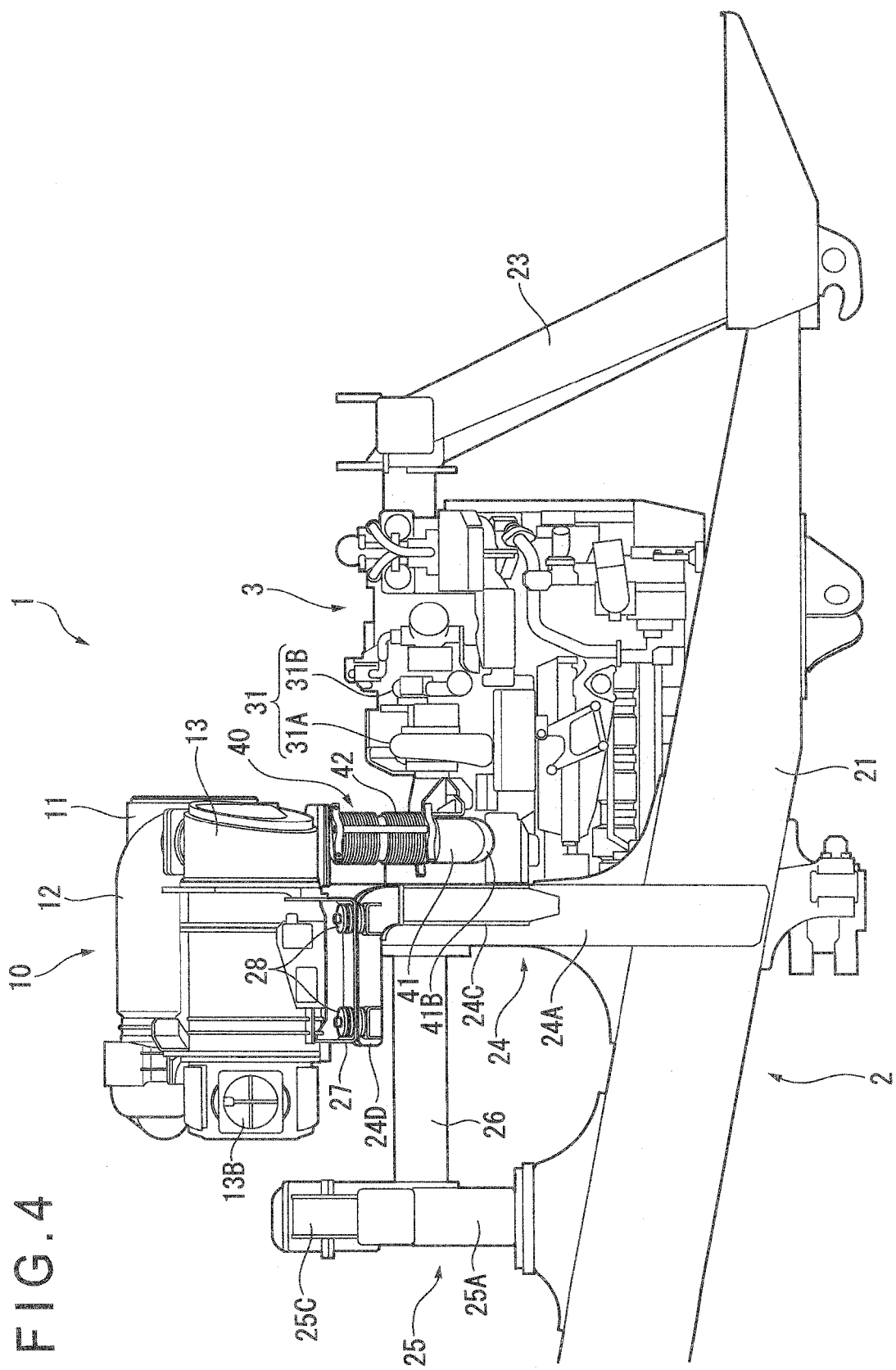
FIG. 4 is a right-side view showing the relevant part of the dump truck.

As shown in FIG. 4, the engine 3 is installed such that a front end of the engine 3 is positioned behind the front support 23 and a back end of the engine 3 is positioned within the length (i.e., length in the front-back direction) of the vertical member 24. The vertical member 24 and the vessel support 25 are connected to each other through a cylindrical side frame 26 extending in the front-back direction. With this arrangement, torsional rigidity of the main frame 2 is reinforced.

As shown in FIGS. 3 to 6, the vertical member 24 includes a pair of vertical frames 24A extending upward and a cross frame 24B bridging upper ends of the vertical frames 24A, thereby providing a portal shape. An interval between the pair of vertical frames 24A in the right-left direction is increased toward upper ends of the vertical frames 24A. The cross frame 24B is formed such that a central portion thereof projects upward and right and left portions thereof are lowered toward the respective ends in the right-left direction.

The cross frame 24B is thus formed because of the following two reasons.

The first reason is to secure a favorable right-side view from the cab 5 without being blocked by the exhaust aftertreatment device 10

The second reason is to shorten a length of an upstream pipe 41 of the communication pipe 40. In case where the cross frame 24B horizontally extends, the exhaust aftertreatment device 10 is to be horizontally installed in the cross frame 24B, whereby a bellows pipe 42 of the communication pipe 40 vertically extends. In such an arrangement, a lower end of the bellows pipe 42 becomes apart from the exhaust turbine outlet 31C, whereby the upstream pipe 41 for connecting the bellows pipe 42 and the exhaust turbine outlet 31C is lengthened. In order to prevent such a disadvantage, the cross frame 24B is angularly formed as described above.

Figure 6:
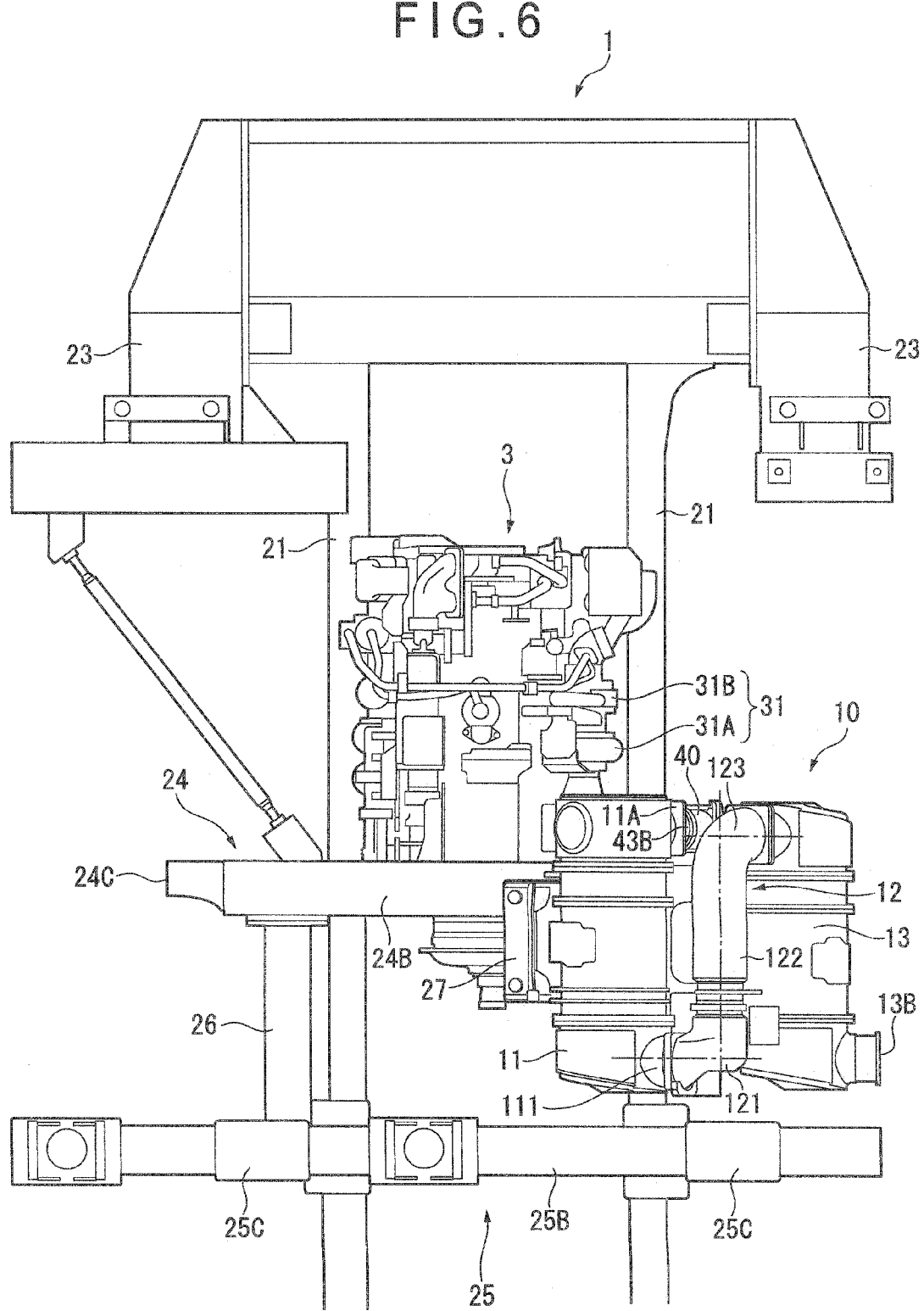
FIG. 6 is a plan view showing the relevant part of the dump truck.

As shown in FIGS. 3, 4 and 6, a connector 24C is provided to an upper end of each of the vertical frames 24A of the vertical member 24. An upper end of a front suspension 9 is rotatably connected to connector 24C (see FIG. 1).

The vessel support 25 is a portal member including a pair of vertical frames 25A and a cross frame 25B bridging upper ends of the vertical frames 25A. The vessel support 25 further includes a pair of supports 25C provided on cross frame 25B. The pair of supports 25C support a front end of the unraised vessel 8 from thereunder.

Description of Arrangement of Communication Pipe

Figure 5:
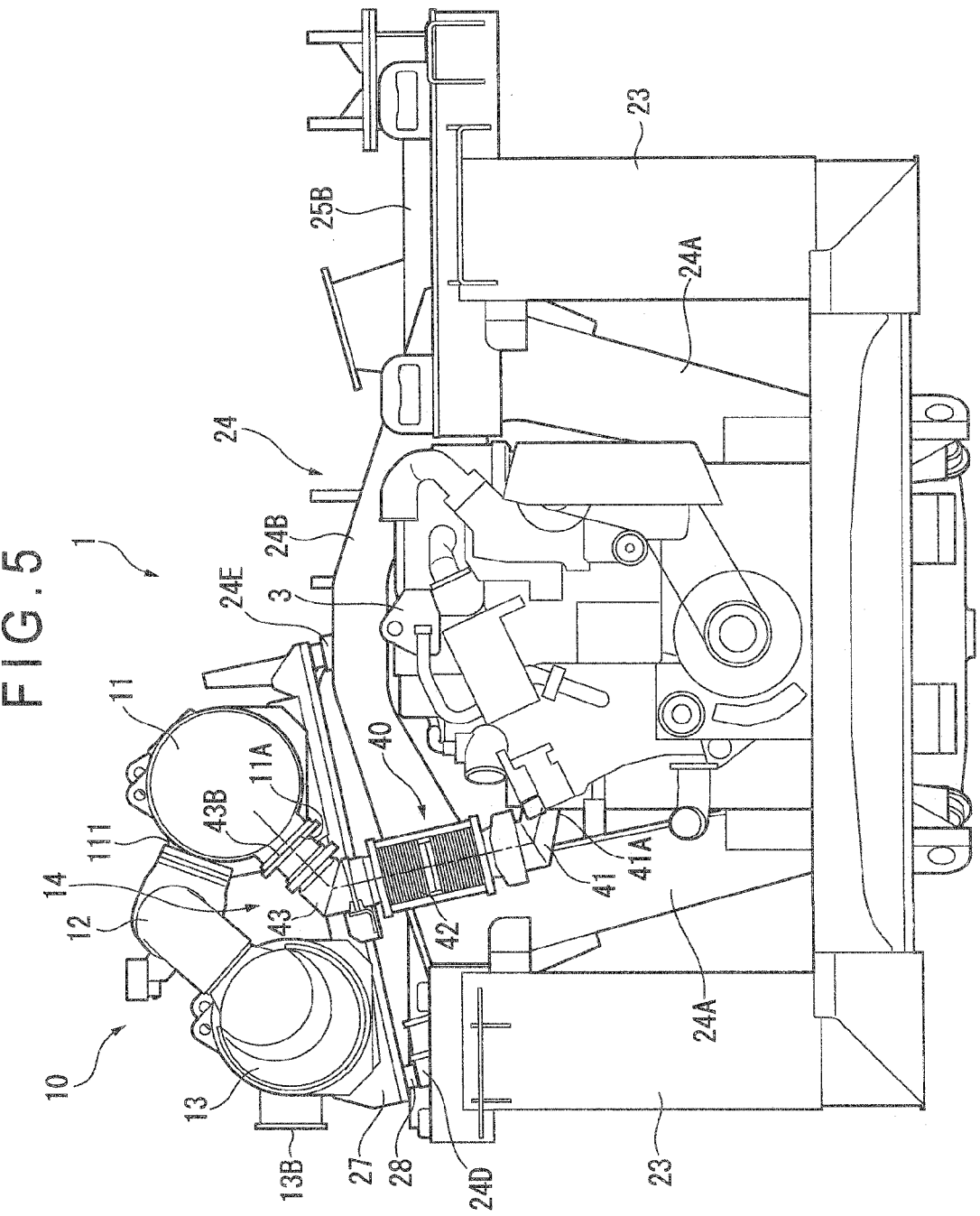
FIG. 5 is a front view showing the relevant part of the dump truck.

As shown in FIG. 5, the communication pipe 40 includes the upstream pipe 41 (a first pipe), the bellows pipe 42 (a second pipe), and a downstream pipe 43 (a third pipe). Exhaust gas sequentially flows through the upstream pipe 41, the bellows pipe 42 and the downstream pipe 43 in the communication pipe 40. The downstream pipe outlet 43B is connected to the DPF device inlet 11A that is the inlet of the exhaust aftertreatment device 10.

The upstream pipe 41 extends from the engine 3 toward the right thereof. The bellows pipe 42, which is extendible and contractable, is connected to the upstream pipe 41 at an obtuse angle and extends diagonally upwards to be apart rightwards from the engine 3. The downstream pipe 43 is connected to the bellows pipe 42 at an obtuse angle and extends left-upwards toward the exhaust aftertreatment device 10. The communication pipe 40 is provided in a channel shape in a front view.

In the right side view shown in FIG. 4, the communication pipe 40 extends in the up-down direction along the vertical frame 24A, in which the downstream pipe outlet 43B (see FIG. 5) is positioned substantially vertically above the upstream pipe inlet 41A.

Since the communication pipe 40 is connected to the exhaust aftertreatment device 10 while passing on the right of the engine 3, maintenance of the engine 3 through the platform 6 is not obstructed due to the communication pipe 40.

Since the communication pipe 40 is provided with the bellows pipe 42, the communication pipe 40 can absorb radial and axial displacements between the engine 3 and the exhaust aftertreatment device 10 caused by vibration and the like during traveling of the dump truck.

A spherical flange or a slidable cylindrical pipe may be alternatively used in place of the bellows pipe 42 or in addition to the bellows pipe 42 in the communication pipe 40.

Description of Arrangement of Exhaust
Aftertreatment Device

The exhaust aftertreatment device 10, into which exhaust gas flows from the communication pipe 40, includes a Diesel Particulate Filter (hereinafter abbreviated as DPF) device 11, a mixing device 12, and a Selective Catalytic Reduction (hereinafter abbreviated as SCR) device 13 in a sequence from an upstream side of an exhaust gas flow direction. In the exemplary embodiment, each of the DPF device 11 and the SCR device 13 is formed in a cylinder extending in the front-back direction as shown in FIG. 6. In the front view shown in FIG. 5, the DPF device 11 is disposed on an inner side of the dump truck in the right-left direction. The SCR device 13 is disposed outside of the DPF device 11 with a space 14 (see FIG. 5) interposed therebetween.

The DPF device inlet 11A that is the inlet of the exhaust aftertreatment device 10 is provided in a front of the DPF device 11 and faces downward to the right. As shown in FIG. 5, the communication pipe 40 extends toward the space 14 between the DPF device 11 and the SCR device 13 to be connected to a diagonally lower portion of the DPF device 11. In other words, the communication pipe 40 is connected to the DPF device 11 within the space 14. Moreover, as shown in FIG. 5, in the front view, the communication pipe 40 is located within the width of the exhaust aftertreatment device 10.

The arrangement of the exhaust aftertreatment device 10 will be described.

The DPF device 11 includes a cylindrical case and a columnar DPF (not shown) housed in the case. The DPF captures particulate matter in the exhaust gas passing through the DPF.

As shown in FIG. 6, the mixing device 12 includes: an upstream elbow pipe 121 that is connected to an outlet pipe 111 of the DPF device 11 and changes the flow direction of the exhaust gas discharged from the DPF device 11 by approximately 90 degrees; a straight pipe 122 that is connected to a downstream end of the upstream elbow pipe 121 and extends in a direction intersecting with an axis of the outlet pipe 111 of the DPF device 11; and a downstream elbow pipe 123 that is connected to a downstream end of the straight pipe 122 and further changes the flow direction of the exhaust gas by approximately 90 degrees.

The upstream elbow pipe 121 is attached with an injector (not shown) that injects a urea aqueous solution as a reductant aqueous solution into the straight pipe 122. The urea aqueous solution injected from the injector into the exhaust gas is thermally decomposed into ammonia by heat of the exhaust gas. Together with the exhaust gas, ammonia is supplied to the SCR device 13 as a reduction-causing agent. The SCR device 13 is connected to a downstream end of the downstream elbow pipe 123.

The SCR device 13 includes a cylindrical case and a columnar SCR (not shown) housed in the case. The SCR reduces and purifies nitrogen oxides in the exhaust gas by using ammonia formed as a reduction-causing agent in the mixing device 12. A catalyst for decreasing ammonia may be provided on the downstream side of the SCR in the case. The catalyst for decreasing ammonia oxidizes ammonia unused in the SCR to be harmless.

The DPF device 11, the mixing device 12 and the SCR device 13 as described above are juxtaposed such that the respective flow directions of the exhaust gas passing therethrough are substantially in parallel. Accordingly, the flow directions of the exhaust gas flowing in the DPF device 11 and the SCR device 13 are opposite to the flow direction of the exhaust gas flowing in the mixing device 12. The exhaust aftertreatment device 10 having this arrangement is substantially S-shaped in the plan view as shown in FIG. 6. As described above, the SCR device outlet 13B that is the outlet of the exhaust aftertreatment device 10 is connected to the vessel inlet 8C through the connecting pipe 51.

As described above, the inlet 8C of the vessel 8 is provided on a right side of a front surface of the vessel 8. The exhaust aftertreatment device 10 is provided to the right of the vertical member 24. Moreover, the exhaust aftertreatment device 10 is provided to the cross frame 24B of the vertical member 24 such that a center of the exhaust aftertreatment device 10 in the front-back direction is shifted backward relative to the cross frame 24B. Accordingly, a distance between the inlet 8C of the vessel 8 and the outlet 13B of the SCR device 13 is shortened.

Description of Installation Arrangement of Exhaust
Aftertreatment Device

As shown in FIG. 3, a bracket 24D extends backward from a top surface of the connector 24C of the vertical member 24. A bracket 24E extends backward from a central back surface of the vertical member 24. The exhaust aftertreatment device 10 is fixed on the brackets 24D and 24E through a sub frame 27 and an anti-vibration rubber 28. The exhaust aftertreatment device 10 is supported on the cross frame 24B of the vertical member 24 in such a cantilever state that the center of the exhaust aftertreatment device 10 in the front-back direction is shifted backward relative to the cross frame 24B while the exhaust aftertreatment device 10 is tilted downward to the right (see FIG. 4).

Since the exhaust aftertreatment device 10 is supported while being tilted downward to the right, a left view from the cab 5 is favorably secured without being blocked by the exhaust aftertreatment device 10.

Since the exhaust aftertreatment device 10 is supported in such a cantilever state that the center of the exhaust aftertreatment device 10 in the front-back direction is shifted backward, a dead space on the back side of the platform 6 is effectively used and maintenance of the engine 3 through the platform 6 is kept from being obstructed by the exhaust aftertreatment device 10.

Since the bracket 24D and the sub frame 27 are provided, the aftertreatment device 10 is reliably supported even though being shifted backward.

In the invention, the position of the anti-vibration rubber 28 is not required to be the same as in the exemplary embodiment. Further, the anti-vibration rubber 28 is not necessarily provided. When the anti-vibration rubber 28 is not provided, other mechanism(s) may be provided to absorb vibration and shock.

Description of Maintenance of Engine

A maintenance method of the engine 3 in the dump truck 1 in the exemplary embodiment will be described with reference to FIGS. 1 and 2. The right-side view of FIG. 1 shows a closed door 6A for the inspection opening 6B while showing an opened door 6A by a chain double-dashed line. The front view of FIG. 2 shows the opened door 6A for the inspection opening 6B.

In the dump truck 1 in the exemplary embodiment, for the maintenance of the engine 3, the operator opens the inspection opening 6B provided on the platform 6 on the right of the cab 5 and performs the maintenance on the engine 3. For instance, since the supercharger 31 is provided in the top-right portion of the engine 3, the maintenance of the supercharger 31 is carried out through the inspection opening 6B. In addition, attachment/detachment of a head cover and adjustment of the fuel injector can be carried out through the inspection opening 6B.

Advantage(s) of Embodiment(s)

According to the exemplary embodiment, the engine 3 is installed to the main frame 2 and the exhaust aftertreatment device 10 is provided on the vertical member 24. In other words, without removing the exhaust aftertreatment device 10, the maintenance of the engine such as attachment/detachment of a head cover and adjustment of the fuel injector can be carried out from above the engine 3.

Since the vertical member 24 is disposed near the back end of the engine 3, by providing the exhaust aftertreatment device 10 on the vertical member 24, a space for the maintenance of the engine 3 can be secured above the engine 3.

Further, since the exhaust aftertreatment device 10 is disposed near the engine 3, a pipe (including the communication pipe 40) for connecting the exhaust aftertreatment device 10 with the engine 3 can be shortened. With this arrangement, layout of the pipe can be simplified.

As described above, in the exemplary embodiment, maintenance of the dump truck 1 can be facilitated.

Description of Modification(s)

The invention is not limited to the above-described embodiment, but includes modifications and improvements as long as an object of the invention can be achieved.

For instance, although the DPF device 11 is disposed on the inner side of the dump truck and the SCR device 13 is disposed outside of the DPF device 11 in the above exemplary embodiment, the DPF device 11 and the SCR device 13 may be transposed or aligned in the front-back direction.

Although the exhaust aftertreatment device 10 includes the DPF device 11 and the SCR device 13 in the exemplary embodiment, the exhaust aftertreatment device 10 may only include the DPF device 11.

The invention is applicable not only to a rigid dump truck but also to an articulated dump truck.

The invention claimed is:

1. A dump truck comprising:
a main frame;
an engine installed to the main frame; and
an exhaust aftertreatment device that purifies exhaust gas from the engine, wherein:
the main frame is provided with a vertical member in a portal shape which projects at a back end of the engine in a vehicle height direction of the dump truck and extends in a vehicle width direction of the dump truck,
the vertical member comprises: a pair of vertical frames that extend in the vehicle height direction with an interval therebetween in the vehicle width direction increased in the vehicle height direction, and a cross frame that extends in the vehicle width direction and bridges upper ends of the pair of vertical frames, at least one side of the cross frame in the vehicle width direction being tilted toward an end thereof, and
the exhaust aftertreatment device is supported on a first side of the at least one side of the cross frame such that a center of the exhaust aftertreatment device in a front-back direction is shifted backward relative to the vertical member.

2. The dump truck according to claim 1, wherein:
a cab for an operator to sit in is positioned at a second side of the cross frame in the vehicle width direction.

3. The dump truck according to claim 2, wherein:
the exhaust aftertreatment device is provided on the tilted cross frame.

* * * * *